United States Patent
Solis et al.

(10) Patent No.: US 9,374,304 B2
(45) Date of Patent: Jun. 21, 2016

(54) END-TO END ROUTE TRACING OVER A NAMED-DATA NETWORK

(71) Applicant: Palo Alto Research Center Incorporated, Palo Alto, CA (US)

(72) Inventors: Ignacio Solis, South San Francisco, CA (US); Glenn C. Scott, Los Altos, CA (US); Michael F. Plass, Mountain View, CA (US); Ian B. Crabtree, Suffolk (GB)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 139 days.

(21) Appl. No.: 14/163,669

(22) Filed: Jan. 24, 2014

(65) Prior Publication Data
US 2015/0215206 A1  Jul. 30, 2015

(51) Int. Cl.
*H04L 12/26*  (2006.01)
*H04L 12/741*  (2013.01)
*H04L 12/701*  (2013.01)
(Continued)

(52) U.S. Cl.
CPC .............. *H04L 45/745* (2013.01); *H04L 41/12* (2013.01); *H04L 43/00* (2013.01); *H04L 43/50* (2013.01); *H04L 45/00* (2013.01); *H04L 47/11* (2013.01); *H04L 67/327* (2013.01)

(58) Field of Classification Search
CPC ....... H04L 45/745; H04L 41/12; H04L 43/50; H04L 47/11; H04L 45/00; H04L 45/54; H04L 45/02; H04L 43/00; H04L 67/327
USPC .................................................. 370/252, 351
See application file for complete search history.

(56) References Cited

U.S. PATENT DOCUMENTS

| 817,441 A | 4/1906 | Niesz |
|---|---|---|
| 4,309,569 A | 1/1982 | Merkle |

(Continued)

FOREIGN PATENT DOCUMENTS

| EP | 1077422 A2 | 2/2001 |
|---|---|---|
| EP | 2124415 A2 | 11/2009 |

(Continued)

OTHER PUBLICATIONS https://code.google.com/p/ccnx-trace/.
(Continued)

*Primary Examiner* — Kwang B Yao
*Assistant Examiner* — Ricardo Castaneyra
(74) *Attorney, Agent, or Firm* — Shun Yao; Park, Vaughan, Fleming & Dowler LLP

(57) ABSTRACT

A route-tracing application can measure the performance of a path in a named-data network using trace agents deployed across various network nodes. During operation, a network node can process a route-tracing Interest by performing a lookup operation in a forwarding information base (FIB) using the Interest's name, in which a respective FIB entry may map the name to a forwarding rule. If the FIB does not include an entry for the Interest's route-tracing name, a trace agent at the network node determines one or more outbound interfaces for the route-tracing operation based on the Interest's name, and creates new route-tracing FIB entries that each maps the Interest's name to a forwarding rule for the determined interfaces. The network node returns a Content Object that satisfies the Interest, in which the Content Object includes the names of the new FIB entries, as well as performance information for the path.

20 Claims, 6 Drawing Sheets

(51) Int. Cl.
*H04L 29/08* (2006.01)
*H04L 12/24* (2006.01)
*H04L 12/801* (2013.01)

(56) References Cited

U.S. PATENT DOCUMENTS

| | | | |
|---|---|---|---|
| 4,921,898 A | 5/1990 | Lenney |
| 5,070,134 A | 12/1991 | Oyamada |
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,467,297 B2 | 6/2013 | Liu |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1* | 4/2004 | Folkes et al. .................. 709/250 |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |
| 2007/0073888 A1 | 3/2007 | Madhok |
| 2007/0094265 A1 | 4/2007 | Korkus |

(56) References Cited

U.S. PATENT DOCUMENTS

| | | |
|---|---|---|
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1* | 6/2010 | Napierala ............... 370/390 |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vanderLinden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |
| 2012/0290669 A1 | 11/2012 | Parks |
| 2012/0290919 A1 | 11/2012 | Melnyk |

(56) References Cited

U.S. PATENT DOCUMENTS

| | | |
|---|---|---|
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | Dekozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |

FOREIGN PATENT DOCUMENTS

| | | |
|---|---|---|
| EP | 2214357 A1 | 8/2010 |
| WO | 03005288 A2 | 1/2003 |
| WO | 03049369 A2 | 6/2003 |
| WO | 2007144388 A1 | 12/2007 |

OTHER PUBLICATIONS

Fall, K. et al., "DTN: an architectural retrospective", Selected areas in communications, IEEE Journal on, vol. 28, No. 5, Jun. 1, 2008, pp. 828-835.

Gritter, M. et al., 'An Architecture for content routing support in the Internet', Proceedings of 3rd Usenix Symposium on Internet Technologies and Systems, 2001, pp. 37-48.

"CCNx," http://ccnx.org/. downloaded Mar. 11, 2015.

"Content Delivery Network", Wikipedia, Dec. 10, 2011, http://en.wikipedia.org/w/index.php?title=Content_delivery_network&oldid=465077460.

"Digital Signature" archived on Aug. 31, 2009 at http://web.archive.org/web/20090831170721/http://en.wikipedia.org/wiki/Digital_signature.

"Introducing JSON," http://www.json.org/. downloaded Mar. 11, 2015.

"Microsoft PlayReady," http://www.microsoft.com/playready/. downloaded Mar. 11, 2015.

"Pursuing a pub/sub internet (Pursuit)," http://www.fp7-pursuit.ew/PursuitWeb/. downloaded Mar. 11, 2015.

"The FP7 4WARD project," http://www.4ward-project.eu/. downloaded Mar. 11, 2015.

A. Broder and A. Karlin, "Multilevel Adaptive Hashing", Jan. 1990, pp. 43-53.

Detti, Andrea, et al. "CONET: a content centric inter-networking architecture." Proceedings of the ACM SIGCOMM workshop on Information-centric networking. ACM, 2011.

A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.

Afanasyev, Alexander, et al. "Interest flooding attack and countermeasures in Named Data Networking." IFIP Networking Conference, 2013. IEEE, 2013.

Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).

B. Ahlgren et al., 'A Survey of Information-centric Networking' IEEE Commun. Magazine, Jul. 2012, pp. 26-36.

B. Lynn. The Pairing-Based Cryptography Library, http://crypto.stanford.edu/pbc/.

Bari, MdFaizul, et al. 'A survey of naming and routing in information-centric networks.' Communications Magazine, IEEE 50.12 (2012): 44-53.

Baugher, Mark et al., "Self-Verifying Names for Read-Only Named Data", 2012 IEEE Conference on Computer Communications Workshops (INFOCOM WKSHPS), Mar. 2012, pp. 274-279.

Brambley, Michael, A novel, low-cost, reduced-sensor approach for providing smart remote monitoring and diagnostics for packaged air conditioners and heat pumps. Pacific Northwest National Laboratory, 2009.

C. Gentry and A. Silverberg. Hierarchical ID-Based Cryptography. Advances in Cryptology—ASIACRYPT 2002. Springer Berlin Heidelberg (2002).

C.A. Wood and E. Uzun, "Flexible end-to-end content security in CCN," in Proc. IEEE CCNC 2014, Las Vegas, CA, USA, Jan. 2014.

Carzaniga, Antonio, Matthew J. Rutherford, and Alexander L. Wolf. 'A routing scheme for content-based networking.' INFOCOM 2004. Twenty-third Annual Joint Conference of the IEEE Computer and Communications Societies. vol. 2. IEEE, 2004.

Cho, Jin-Hee, Ananthram Swami, and Ray Chen. "A survey on trust management for mobile ad hoc networks." Communications Surveys & Tutorials, IEEE 13.4 (2011): 562-583.

(56) References Cited

OTHER PUBLICATIONS

Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments." Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh, C. Gentry, and B. Waters, 'Collusion resistant broadcast encryption with short ciphertexts and private keys,' in Proc. CRYPTO 2005, Santa Barbara, CA, USA, Aug. 2005, pp. 1-19.
D. Boneh and M. Franklin. Identity-Based Encryption from the Well Pairing. Advances in Cryptology—CRYPTO 2001, vol. 2139, Springer Berlin Heidelberg (2001).
D.K. Smetters, P. Golle, and J.D. Thornton, "CCNx access control specifications," PARC, Tech. Rep., Jul. 2010.
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstra, Edsger W., and Carel S. Scholten, 'Termination detection for diffusing computations.' Information Processing Letters 11.1 (1980): 1-4.
Dijkstra, Edsger W., Wim HJ Feijen, and A_J M. Van Gasteren. "Derivation of a termination detection algorithm for distributed computations." Control Flow and Data Flow: concepts of distributed programming. Springer Berlin Heidelberg, 1986. 507-512.
E. Rescorla and N. Modadugu, "Datagram transport layer security," IETF RFC 4347, Apr. 2006.
E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Ateniese, K. Fu, M. Green, and S. Hohenberger. Improved Proxy Reencyrption Schemes with Applications to Secure Distributed Storage. In the 12th Annual Network and Distributed System Security Symposium (2005).
G. Tyson, S. Kaune, S. Miles, Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
G. Wang, Q. Liu, and J. Wu, "Hierachical attribute-based encryption for fine-grained access control in cloud storage services," in Proc. ACM CCS 2010, Chicago, IL, USA, Oct. 2010, pp. 735-737.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19. No. 4. ACM, 1989.
Garcia-Luna-Aceves, Jose J. 'Name-Based Content Routing in Information Centric Networks Using Distance Information' Proc ACM ICN 2014, Sep. 2014.
Ghali, Cesar, GeneTsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Information-centric networking: seeing the forest for the trees." Proceedings of the 10th ACM Workshop on Hot Topics in Networks. ACM, 2011.
Ghodsi, Ali, et al. "Naming in content-oriented architectures." Proceedings of the ACM SIGCOMM workshop on Information-centric networking. ACM, 2011.
Gupta, Anjali, Barbara Liskov, and Rodrigo Rodrigues. "Efficient Routing for Peerto-Peer Overlays." NSDI. vol. 4. 2004.
H. Xiong, X. Zhang, W. Zhu, and D. Yao. CloudSeal: End-to-End Content Protection in Cloud-based Storage and Delivery Services. Security and Privacy in Communication Networks. Springer Berlin Heidelberg (2012).
Heckerman, David, John S. Breese, and Koos Rommelse. "Decision-Theoretic Troubleshooting." Communications of the ACM. 1995.
Heinemeier, Kristin, et al. "Uncertainties in Achieving Energy Savings from HVAC Maintenance Measures in the Field." ASHRAE Transactions 118.Part 2 {2012).
Herlich, Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hogue et al., 'NLSR: Named-data Link State Routing Protocol', Aug. 12, 2013, ICN 2013, pp. 15-20.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Bethencourt, A, Sahai, and B. Waters, 'Ciphertext-policy attribute-based encryption,' in Proc. IEEE Security & Privacy 2007, Berkeley, CA, USA, May 2007, pp. 321-334.
J. Hur, "Improving security and efficiency in attribute-based data sharing," IEEE Trans. Knowledge Data Eng., vol. 25, No. 10, pp. 2271-2282, Oct. 2013.
J. Shao and Z. Cao. CCA-Secure Proxy Re-Encryption without Pairings. Public Key Cryptography. Springer Lecture Notes in Computer Sciencevol. 5443 (2009).
V. Jacobson et al., 'Networking Named Content,' Proc. IEEE CoNEXT '09, Dec. 2009.
Jacobson, Van et al., "Content-Centric Networking, Whitepaper Describing Future Assurable Global Networks", Palo Alto Research Center, Inc., Jan. 30, 2007, pp. 1-9.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50 Issue 7 (p. 3843).
Ji, Kun, et al. "Prognostics enabled resilient control for model-based building automation systems." Proceedings of the 12th Conference of International Building Performance Simulation Association. 2011.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
Katipamula, Srinivas, and Michael R. Brambley. "Review article: methods for fault detection, diagnostics, and prognostics for building systemsa review, Part I." HVAC&R Research 11.1 (2005): 3-25.
Katipamula, Srinivas, and Michael R. Brambley. "Review article: methods for fault detection, diagnostics, and prognostics for building systemsa review, Part II." HVAC&R Research 11.2 (2005): 169-187.
Koponen, Teemu et al., "A Data-Oriented (and Beyond) Network Architecture", SIGCOMM '07, Aug. 27-31, 2007, Kyoto, Japan, XP-002579021, p. 181-192.
L. Wang et al., 'OSPFN: An OSPF Based Routing Protocol for Named Data Networking,' Technical Report NDN-0003, 2012.

(56) References Cited

OTHER PUBLICATIONS

L. Zhou, V. Varadharajan, and M. Hitchens, "Achieving secure role-based access control on encrypted data in cloud storage," IEEE Trans. Inf. Forensics Security, vol. 8, No. 12, pp. 1947-1960, Dec. 2013.
Li, Wenjia, Anupam Joshi, and Tim Finin. "Coping with node misbehaviors in ad hoc networks: A multi-dimensional trust management approach." Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Blaze, G. Bleumer, and M. Strauss, 'Divertible protocols and atomic prosy cryptography,' in Proc. Eurocrypt 1998, Espoo, Finland, May-Jun. 1998, pp. 127-144.
M. Green and G. Ateniese, "Identity-based proxy re-encryption," in Proc. ACNS 2007, Zhuhai, China, Jun. 2007, pp. 288-306.
M. Ion, J. Zhang, and E.M. Schooler, "Toward content-centric privacy in ICN: Attribute-based encryption and routing," in Proc. ACM SIGCOMM ICN 2013, Hong Kong, China, Aug. 2013, pp. 39-40.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v. 1.1," IETF RFC 7292, K. Moriarty, Ed., Jul. 2014.
M. Parsa and J.J. Garcia-Luna-Aceves, "A Protocol for Scalable Loop-free Multicast Routing." IEEE JSAC, Apr. 1997.
M. Walfish, H. Balakrishnan, and S. Shenker, "Untangling the web from DNS," in Proc. USENIX NSDI 2004, Oct. 2010, pp. 735-737.
Mahadevan, Priya, et al. "Orbis: rescaling degree correlations to generate annotated internet topologies." ACM SIGCOMM Computer Communication Review. vol. 37. No. 4. ACM, 2007.
Mahadevan, Priya, et al. "Systematic topology analysis and generation using degree correlations." ACM SIGCOMM Computer Communication Review. vol. 36. No. 4. ACM, 2006.
Matocha, Jeff, and Tracy Camp. 'A taxonomy of distributed termination detection algorithms.' Journal of Systems and Software 43.3 (1998): 207-221.
Matted Varvello et al., "Caesar: A Content Router for High Speed Forwarding", ICN 2012, Second Edition on Information-Centric Networking, New York, Aug. 2012.
McWilliams, Jennifer A., and Iain S. Walker. "Home Energy Article: A Systems Approach to Retrofitting Residential HVAC Systems." Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE—A General Framework for Stochastic and Hybrid Modelbased Diagnosis." Proc. DX 7 (2007): 162-169.
NDN Project [online], http://www.named-data.net/, Downloaded Mar. 9, 2015.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
R. H. Deng, J. Weng, S. Liu, and K. Chen. Chosen-Ciphertext Secure Proxy Re-Encryption without Pairings. CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress in Cryptology—AFRICACRYPT 2010. Springer Berlin Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Jahid, P. Mittal, and N. Borisov, "EASiER: Encryption-based access control in social network with efficient revocation," in Proc. ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
S. Kumar et al. "Peacock Hashing: Deterministic and Updatable Hashing for High Performance Networking," 2008, pp. 556-564.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012. Located online at http://www.sandvine.com/downloads/documents/Phenomenal H 2012/Sandvine Global Internet Phenomena Report 1H 2012.pdf.
Scalable and Adaptive Internet Solutions (SAIL) Project [online], http://sail-project.eu/ Downloaded Mar. 9, 2015.
Schein, Jeffrey, and Steven T. Bushby. A Simulation Study of a Hierarchical, Rule-Based Method for System-Level Fault Detection and Diagnostics in HVAC Systems. US Department of Commerce,[Technology Administration], National Institute of Standards and Technology, 2005.
Shani, Guy, Joelle Pineau, and Robert Kaplow. "A survey of point-based POMDP solvers." Autonomous Agents and Multi-Agent Systems 27.1 (2013): 1-51.
Sheppard, John W., and Stephyn GW Butcher. "A formal analysis of fault diagnosis with d-matrices." Journal of Electronic Testing 23.4 (2007): 309-322.
Shih, Eugene et al., 'Wake on Wireless: An Event Driven Energy Saving Strategy for Battery Operated Devices', Sep. 23, 2002, pp. 160-171.
Shneyderman, Alex et al., 'Mobile VPN: Delivering Advanced Services in Next Generation Wireless Systems', Jan. 1, 2003, pp. 3-29.
Solis, Ignacio, and J. J. Garcia-Luna-Aceves. 'Robust content dissemination in disrupted environments.' proceedings of the third ACM workshop on Challenged networks. ACM, 2008.
Sun, Ying, and Daniel S. Weld. "A framework for model-based repair." AAAI. 1993.
T. Ballardie, P. Francis, and J. Crowcroft, "Core Based Trees (CBT)," Proc. ACM SIGCOMM '88, Aug. 1988.
T. Dierts, "The transport layer security (TLS) protocol version 1.2," IETF RFC 5246, 2008.
T. Koponen, M. Chawla, B.-G. Chun, A. Ermolinskiy, K.H. Kim, S. Shenker, and I. Stoica, 'A data-oriented (and beyond) network architecture,' ACM SIGCOMM Computer Communication Review, vol. 37, No. 4, pp. 181-192, Oct. 2007.
The Despotify Project (2012). Available online at http://despotify.sourceforge.net/.
V. Goyal, 0. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
V. Jacobson, D.K. Smetters, J.D. Thornton, M.F. Plass, N.H. Briggs, and R.L. Braynard, 'Networking named content,' in Proc. ACM CoNEXT 2009, Rome, Italy, Dec. 2009, pp. 1-12.
V. K. Adhikari, S. Jain, Y. Chen, and Z.-L. Zhang. Vivisecting Youtube:An Active Measurement Study. In INFOCOM12 Mini-conference (2012).
Verma, Vandi, Joquin Fernandez, and Reid Simmons. "Probabilistic models for monitoring and fault diagnosis." The Second IARP and

(56) References Cited

OTHER PUBLICATIONS

IEEE/RAS Joint Workshop on Technical Challenges for Dependable Robots in Human Environments. Ed. Raja Chatila. Oct. 2002.

Vijay Kumar Adhikari, Yang Guo, Fang Hao, Matteo Varvello, Volker Hilt, Moritz Steiner, and Zhi-Li Zhang. Unreeling Netflix: Understanding and Improving Multi-CDN Movie Delivery. In the Proceedings of IEEE INFOCOM 2012.

Vutukury, Srinivas, and J. J. Garcia-Luna-Aceves. A simple approximation to minimum-delay routing. vol. 29. No. 4. ACM, 1999.

W.-G. Tzeng and Z.-J. Tzeng, "A public-key traitor tracing scheme with revocation using dynamic shares," in Proc. PKC 2001, Cheju Island, Korea, Feb. 2001, pp. 207-224.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592. Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomenos, George, et al. "A survey of information-centric networking research." Communications Surveys & Tutorials, IEEE 16.2 (2014): 1024-1049.

Yi, Cheng, et al. 'A case for stateful forwarding plane.' Computer Communications 36.7 (2013): 779-791.

Yi, Cheng, et al. 'Adaptive forwarding in named data networking.' ACM SIGCOMM computer communication review 42.3 (2012): 62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014): 66-73.

Wetherall, David, "Active Network vision and reality: Lessons form a capsule-based system", ACM Symposium on Operating Systems Principles, Dec. 1, 1999. pp. 64-79.

Kulkarni A.B. et al., "Implementation of a prototype active network", IEEE, Open Architectures and Network Programming, Apr. 3, 1998, pp. 130-142.

Soh et al., "Efficient Prefix Updates for IP Router Using Lexicographic Ordering and Updateable Address Set", Jan. 2008, IEEE Transactions on Computers, vol. 57, No. 1.

Beben et al., "Content Aware Network based on Virtual Infrastructure", 2012 13th ACIS International Conference on Software Engineering.

Biradar et al., "Review of multicast routing mechanisms in mobile ad hoc networks", Aug. 16, Journal of Network$.

D. Trossen and G. Parisis, "Designing and realizing and information-centric Internet," IEEE Communications Magazing, vol. 50, No. 7, pp. 60-67, Jul. 2012.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in Named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Hur and D.K. Noh, "Attribute-based access control with efficient revocation in data outsourcing systers," IEEE Trans. Parallel Distrib. Syst, vol. 22, No. 7, pp. 1214-1221, Jul. 2011.

J. Lotspiech, S. Nusser, and F. Pestoni. Anonymous Trust: Digit.

Kaya et al., "A Low Power Lookup Technique for Multi-Hashing Network Applications", 2006 IEEE Computer Society Annual Symposium on Emerging VLSI Technologies and Architectures, Mar. 2006.

S. Kamara and K. Lauter. Cryptographic Cloud Storage. Financial Cryptography and Data Security. Springer Berlin Heidelberg (2010).

RTMP (2009). Available online at http://wwwimages.adobe.com/www.adobe.com/content/dam/Adobe/en/devnet/rtmp/pdf/rtmp specification 1.0.pdf.

Hogue et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

* cited by examiner

END-TO END ROUTE TRACING OVER A NAMED-DATA NETWORK

FIELD

The present disclosure generally relates to analyzing a network path of a computer network. More specifically, the present disclosure relates to a method and apparatus for measuring the performance of a path in a named-data network (NDN).

RELATED ART

Internet Protocol (IP) networks use a tool called traceroute to gather information about the paths taken by packets when traversing a network. During traceroute, a source node can send an "echo request" packet across a network toward a destination address, and receives an "echo reply" message from network nodes along a path toward the destination (e.g., router).

Traceroute exploits a time-to-live (TTL) field on the packet to specify a maximum number of hops for the packet's path, which the traceroute tool uses to measure transit delays. At each hop toward the destination node, the packet arrives at a new node that decreases the TTL before forwarding the packet. When a packet reaches a TTL of 0 at a node, the node creates and returns an error packet that informs the source node that there is an error with the packet.

The traceroute application exploits error packets from a path's nodes to generate a trace of the path. In a first iteration, the traceroute application sends a packet to a destination node with a TTL of 1 to obtain an error packet from the first-hop node. Traceroute can determine which node corresponds to the first hop from the return message. Traceroute then repeats the process, increasing the TTL value by 1 for each iteration. After N iterations for a path of length N, traceroute receives a reply from nodes at each hop along the path, and analyzes these replies to generate a trace of the path.

Unfortunately, the trace route technique does not work in computer networks where a packet does not include a TTL field, such as in a content-centric network (CCN) or a named-data network (NDN). In CCN, a network node can request content by disseminating an Interest packet that includes a name for the requested content. Other nodes can either forward the Interest based on the content's name, or can return a Content Object that includes the requested content to satisfy the Interest.

SUMMARY

One embodiment of the present invention provides a system for measuring the performance of a path in a named-data network. During operation, a source node can disseminate a route-tracing Interest to determine information for paths to a content producer associated with a given piece of data. A network node that receives the Interest can determine whether the Interest's name is associated with a namespace not provided by the network node. If the Interest's name is not provided by the network node, the network node can determine one or more outbound interfaces for the route-tracing operation based on the Interest's name, and creates one or more new forwarding information base (FIB) entries for the outbound interfaces. A FIB entry can map the Interest's name to a forwarding rule that includes a corresponding outbound interface. Subsequently, the network node returns a Content Object that satisfies the Interest, and that includes at least the names of the new FIB entries.

In one variation on this embodiment, the system determines trace information for the local network node. The trace information can include a timestamp, a total transit time for the path, an average reply time for Interests issued by a node under a namespace, a transit time to each neighbor, and a set of links to neighboring nodes. The trace information can also include a number of content objects cached under a traced prefix, names for the cached content objects, an amount of free space or churn, congestion information, power status information, location information, a node identifier, and a number of pending Interests for the namespace.

In a further variation, the network node generates the Content Object to also include the trace information.

In a further variation, the network node receives a second Interest that includes a name associated with a second route-tracing operation. If the local network node determines that the second Interest's name corresponds to a namespace that is provided by the local network node, the network node generates a second Content Object that includes at least trace information associated with the second route-tracing operation. The network node can then return the second Content Object to satisfy the second Interest.

In a further variation, if the network node determines that an outbound interface exists for the second route-tracing operation, based on the second Interest's name, the network node can create a forwarding information base (FIB) entry for the outbound interface. Hence, by creating the FIB entry, the network node creates a path that "punches through" to a neighboring node associated with the namespace. The network node can also create the second Content Object to include a name for the new FIB entry, which allows the network node to return both the trace information from the local network node, as well as information on outbound interfaces to one or more neighboring nodes associated with the namespace.

In a further variation, determining that the Interest's name is associated with a route-tracing operation involves determining that a component of the Interest's name matches a predetermined name for a route-tracing operation or application.

In one variation on this embodiment, creating the new FIB entry involves determining an interface identifier for the outbound interface. The network node generates a trace name that includes the Interest's name and the interface identifier. The network node then creates the FIB entry to map the trace name to the forwarding rule that includes the outbound interface.

In one variation on this embodiment, the network node removes a FIB entry after determining that a corresponding timeout period has been reached, after detecting that a corresponding route-tracing operation has completed, or after receiving, from a trace program, a message that includes instructions to remove the FIB entry.

In one variation on this embodiment, the name includes a set of one or more name components. Each name component indicates one or more of a traceroute application for processing the Interest, a name for a piece of data for which to perform the route-tracing operation, an outgoing interface for one or more nodes along a path, and a forwarding rule to enter into the FIB.

In one variation on this embodiment, determining whether the Interest's name is associated with a namespace provided by the network node involves performing a lookup operation in the FIB using the Interest's name, in which a respective FIB entry maps a name to a forwarding rule.

BRIEF DESCRIPTION OF THE FIGURES

In the figures, like reference numerals refer to the same figure elements.

DETAILED DESCRIPTION

Figure 1:
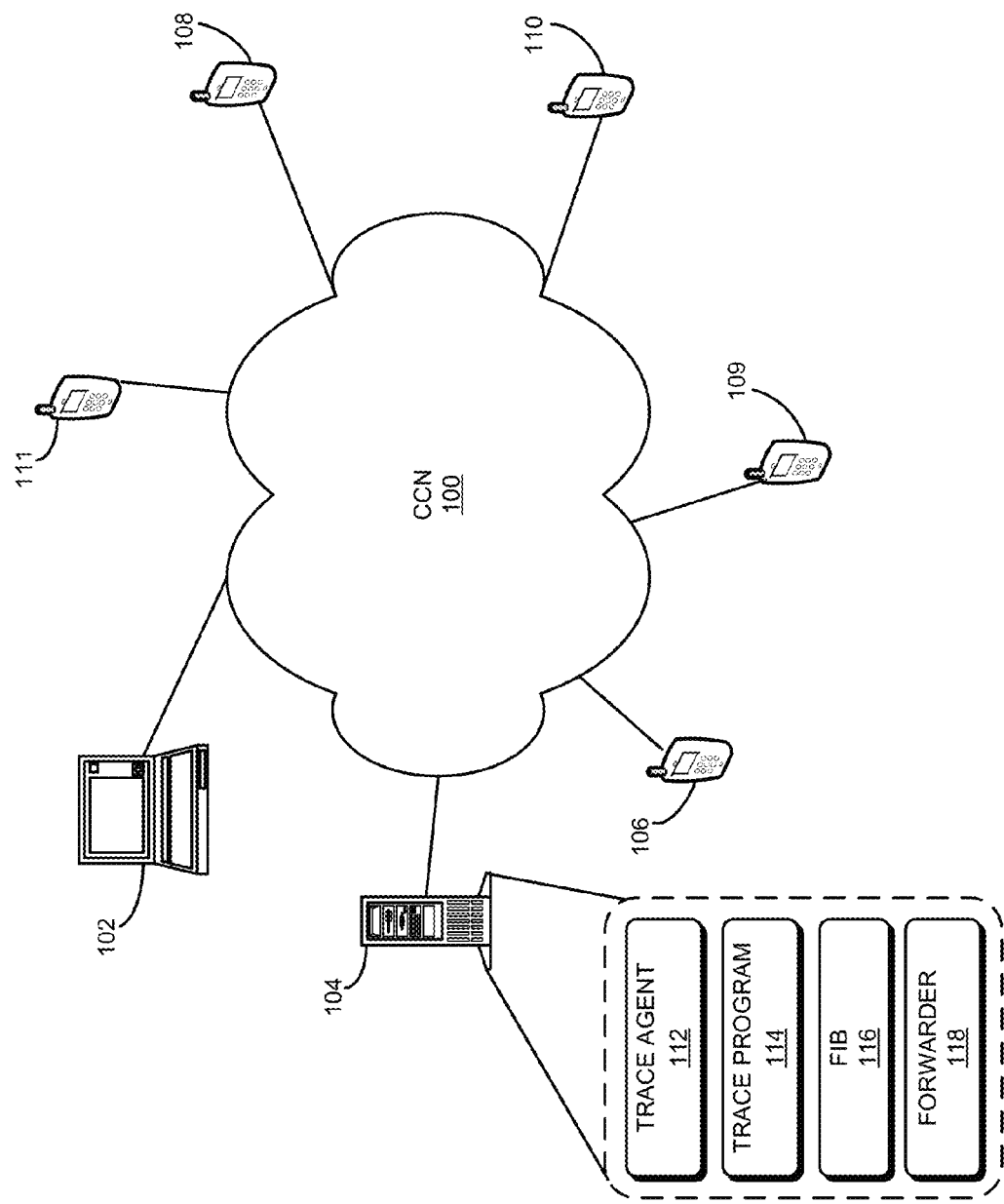
FIG. 1 presents a diagram illustrating an exemplary network environment that includes a CCN, in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

Embodiments of the present invention solve the problem of measuring the correct forwarding performance of network nodes in a content-centric network (CCN). For example, the CCN nodes can include a "trace agent" application that adds forwarding rule entries to FIBs of nodes that form part of the path. These entries allow Interests to directly flow through nodes during subsequent path traversals, thereby avoiding unnecessary processing by the trace agents at the nodes and any associated delays as the Interests head toward their destination node.

A trace program can determine a performance of a path toward a network node that can satisfy a given Interest by disseminating a path-tracing Interest to this destination node. However, a typical trace program may send an Interest that flows from one trace agent to another along a path of intermediate nodes toward the destination node. Using the trace agent to process the Interest at intermediate nodes adds to each node's overall forwarding time, which makes it difficult to measure the correct forwarding performance of the nodes along the path. This results in an inaccurate propagation delay that not only includes the time to forward the Interest toward the destination node, but also includes the amount of time each intermediate node consumed to process the Interest at the trace agent.

To solve this problem, when an Interest arrives at an intermediate node, the node directly forwards the Interest to the next node if a rule entry exists in the FIB for forwarding the Interest. This avoids unnecessary overhead due to trace agent processing. On the other hand, if the FIB does not include a rule entry for forwarding the Interest, then the node forwards the Interest to a trace agent running on the local node that creates the FIB entry.

The trace agent can create one or more forwarding rule entries for reaching neighboring nodes, and adds them to the local FIB. The trace agent also generates a Content Object for the source trace program, and returns the Content Object to satisfy the Interest. The Content Object can include the FIB entry name and trace information from the local node. After receiving a reply from a node, the trace program at the source node can generate a new Interest with the FIB entry name. The new Interest allows the trace program to perform a trace that reaches an additional node along the path.

When the new Interest arrives at the same intermediate described above node, the node's trace agent will not need to perform any additional processing on the Interest as there will be an entry in the FIB that the forwarding node can use to forward the Interest. This allows the Interest to propagate toward the destination node without incurring additional processing overhead at each intermediate node.

In some embodiments, the trace program at the source node can trace a path toward a content producer associated with a given name by adding a path-tracing prefix to the name, and creating a path-tracing Interest that includes the modified name. For example, the prefix can be /trace/agent/. Trace agents can register themselves as a default destination for the namespace "/trace/agent/." If an incoming Interest has the prefix "/trace/agent/Interface2" but the FIB does not include a forwarding rule entry for this prefix, then the network node may forward the Interest to the local trace agent (e.g., based on the prefix "/trace/agent"). The trace agent adds new forwarding rule entries to the local FIB.

After the trace program at the source node receives the reply from each network node along the path, the trace program may compute the correct forwarding performance of these nodes. For example, the network path can include a source node "A" that includes the trace program, intermediate nodes "B" and "C," and a destination node "D." When node C sends the reply to node A, the trace program may compute the correct forwarding performance of node B based on the time required for an Interest packet to arrive at node C. Also, when node D sends a reply to node A, the trace program may also compute the correct forwarding performance for nodes B and C together. The trace program can derive the performance for node C based on the known performance for node B.

The examples hereinafter describe using a path-tracing prefix to escape normal CCN operation and trigger the path-tracing operations (e.g., the prefix "/trace/agent"), without interrupting the flow of regular traffic through the nodes.

However, in some embodiments, alternative path-tracing indicators are possible, such as by adding a path-tracing suffix to a Content Object's name (e.g., " . . . /trace").

Content-Centric Network Architecture

In a CCN, communication is driven by the consumers of data. The CCN architecture provides two packet types: an Interest packet and a Content Object (e.g., data) packet. An Interest packet (also called a "query") is a request for some content. An Interest packet encodes a special form of query that expresses what content is desired and what content is not desired. A Content Object packet includes a unit of content. Content Object packets are self-identifying by carrying within them their full name. A consumer asks for content by broadcasting its Interest over the content centric network, and any recipient of the Interest that can satisfy the Interest can respond with a Content object. Content Objects are transmitted only in response to an Interest, and consumes that Interest. Both Interest and Content objects identify the content being exchanged by the content name (or CCN name). In one embodiment, a Content Object can "satisfy" an Interest if the CCN name in the Interest packet is a prefix of the CCN name in the data packet. The following terms describe elements of a named data network (NDN) architecture, such as a content-centric network (CCN):

Content Object: A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Name: A name in an NDN is typically location independent and uniquely identifies a Content Object. A data-forwarding device can use the name or name prefix to forward an Interest packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include a non-hierarchical identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest: A packet that indicates a request for a piece of data, and includes a name (or a name prefix) for the piece of data. A data consumer can disseminate a request or Interest across an information-centric network, which NDN routers can propagate toward a storage device (e.g., a cache server) or a data producer that can provide the requested data to satisfy the request or Interest.

In some embodiments, the NDN system can include a content-centric networking (CCN) architecture. However, the methods disclosed herein are also applicable to other NDN or other information-centric network (ICN) architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

Exemplary Architecture of a CCN

FIG. 1 presents a diagram illustrating an exemplary network environment that includes a CCN 100, in accordance with an embodiment of the present invention. CCN 100 includes a number of devices, such as a laptop computer 102, a media server 104, and smartphones 106-111, coupled to each other via CCN 100. Note that the devices can be any type of a computing device, including mobile computing devices, such as a laptop computer, a tablet or slate computer, a smartphone, or a personal digital assistant (PDA), or a stationary computing device, such as a desktop computer or a home media server.

In addition, each device may have a trace agent, a trace program, a FIB, and a forwarder, among other components. An example of the components is illustrated for media server 104, including a trace agent 112, a trace program 114, a FIB 116, and a forwarder 118. Trace program 114 submits Interests to the network, in order to request content stored on nodes of the CCN. Trace agent 112 facilitates path tracing and measuring the forwarding performance of nodes. FIB 116 is a forwarding table. The forwarding table contains information for a node to determine to which neighbor node or nodes an Interest should be sent. Forwarder 118 forwards Interests and/or packets on the network. The interaction between a trace program and trace agents located on a trace path is discussed with respect to FIG. 2, and further details are provided with the descriptions accompanying FIG. 3A and FIG. 3B.

Measuring Correct Forwarding Performance

Figure 2:
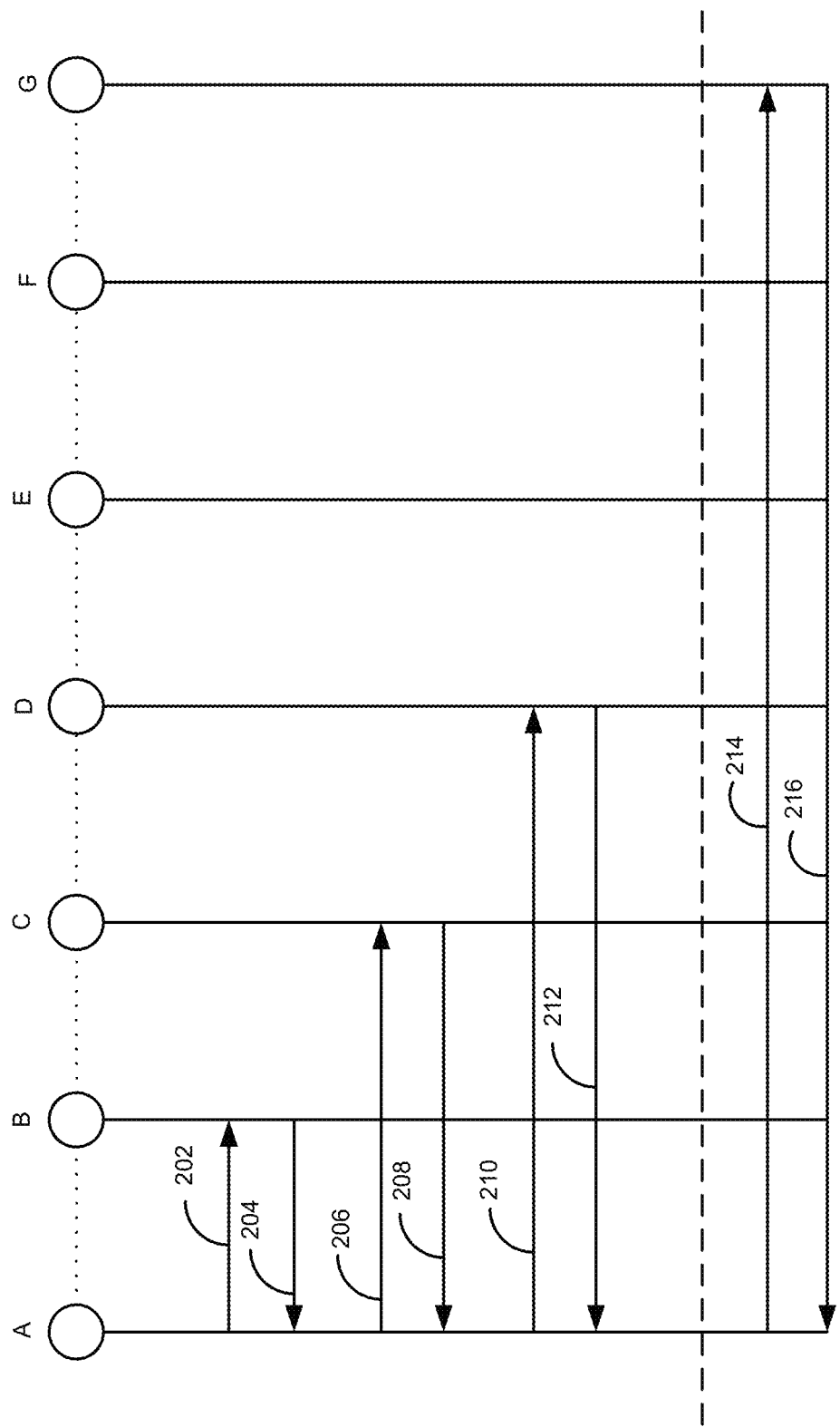
FIG. 2 presents a time-space diagram illustrating a process of measuring the correct forwarding performance of nodes in a CCN, in accordance with an embodiment of the present invention.

FIG. 2 presents a time-space diagram illustrating a process of measuring the correct forwarding performance of nodes in a CCN, in accordance with an embodiment of the present invention. At each node in a path from a trace program's node to a destination node storing the contents of a traced name, there is a trace agent that may be monitoring the namespace /trace/agent/. When the trace agent detects an Interest in the namespace that does not have a matching FIB entry for an outbound interface, the trace agent processes the Interest and adds one or more FIB entry forwarding rules to the FIB. The trace agent sets the FIB entry forwarding rules to point to interfaces between the node of the trace agent and a next-hop node toward the destination node.

In some implementations, a trace agent can register itself as a default destination for the namespace "/trace/agent/." If an incoming Interest has the prefix "/trace/agent/" but the FIB does not include a forwarding rule entry for the Interest's full name (e.g., "/trace/agent/Interface2"), then the network node may forward the Interest to the local trace agent to create the necessary FIB entries.

The trace agent then generates a Content Object that contains the names of the forwarding rule entries in the FIB as well as other trace information, and returns the Content Object to the trace program. The trace program generates a new Interest with the names of the forwarding rule entries, and sends the new Interest to the CCN. The forwarding rule entries allow the new Interest to flow directly through the node, without processing by the trace agent, thereby facilitating correct forwarding performance measurements.

In FIG. 2, each of nodes A-G includes a trace agent that has registered itself as a default destination for the namespace /trace/agent/. Node A includes a trace program that initiates the route-tracing process, and node G serves as the destination node for the route-tracing process. When the trace agent at an intermediate node receives an Interest in the namespace, the trace agent processes the Interest and adds a FIB entry to an associated FIB. For example, a trace agent running at node A may create a FIB entry that points to the interface AB, and returns a Content Object with the FIB entry name to trace program at node A.

After receiving the Content Object, the trace program generates a new Interest 202 with the FIB entry name, and sends Interest 202 to node B. The steps performed between the trace program and each of the individual nodes are discussed in greater detail with respect to FIG. 3. Node B also performs steps illustrated in FIG. 3B to add a FIB entry to its FIB, and returns a Content Object 204 with a FIB entry name to trace program.

The trace program can then generate and disseminates another Interest 206 for the received FIB entry name, which is propagated to node C. Interest 206 flows through node B without the additional overhead of agent processing. Node C performs steps illustrated in FIG. 3 to add a FIB entry to its FIB, and returns a Content Object 208 with a FIB entry name for the trace program. Hence, the trace program can now compute the correct forwarding performance of node B, without the computation being affected by the overhead of the trace agent processing at node B.

After iteratively sending Interests for nodes D, E, and F, the trace program computes correct forwarding performance for each of nodes F, E, and D without the overhead of the trace agent. Trace program 114 then generates and sends another Interest 214 toward the destination node G, and node G receives Interest 214 over the network. Node G may respond with a Content Object 216 that satisfies Interest 214, and also includes trace information for node A. The trace program at node A can compute the correct forwarding performance of nodes F, E, D, C and B, without the overhead of trace agent processing at intermediate nodes influencing the computation results.

At each node a trace agent appends the trace name to include the id component of the next hop. At the end of the trace process, the final Interest includes all the nodes/ids/links as name components. Note that this type of tracing can also be adapted to other networks that are not content-based or name-based.

At every step in the process, each hop in the network also returns trace information to node A. This trace information can include the time it took for the Interest to reach the trace agent and the name and number of Content Objects cached under the traced prefix. The information can include various items related to the namespace, like the average reply times for Interests issued by that node under that namespace or the number of pending Interests for that namespace. The trace information can also include information that is specific to that node but not to the namespace, such as a set of links of the node, an amount of free space or churn, a congestion, a power status, a location, a node identifier (ID), etc. The trace program can present the path information in various ways. For example, the trace program can present the trace result as a set of node identifiers. Alternatively, the trace program can display a set of interface or face identifiers. The term "face" hereinafter refers to an interface or a virtual interface.

Sending an Interest to a Trace Agent

Figure 3A:
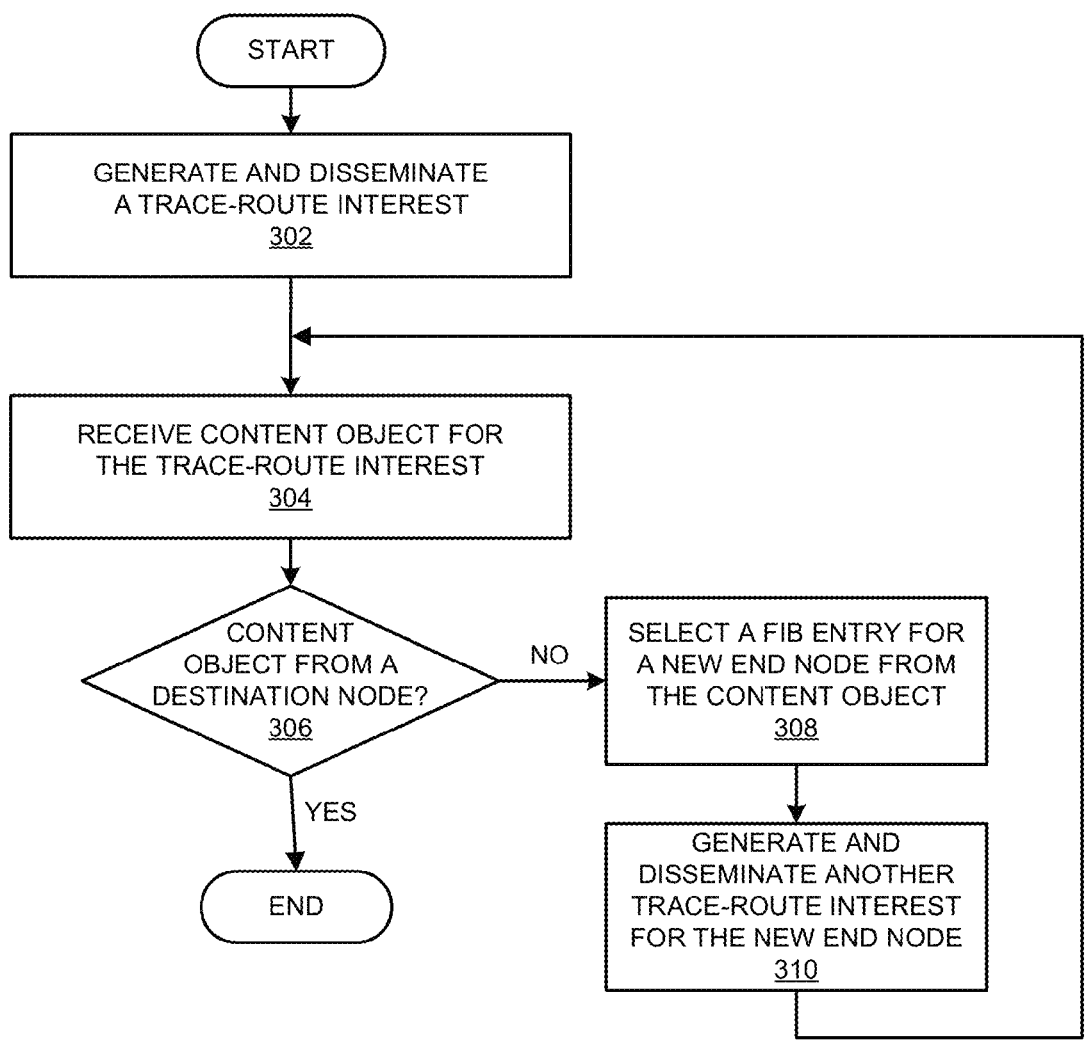
FIG. 3A presents a flow chart illustrating an exemplary process for a trace program disseminating an Interest to measure a forwarding performance, in accordance with an embodiment of the present invention.

FIG. 3A presents a flow chart illustrating an exemplary process for a trace program disseminating an Interest to measure a forwarding performance, in accordance with an embodiment of the present invention. The processes illustrated in FIG. 3A and FIG. 3B measure the correct forwarding performance of each node of a trace path. The communications and operations depicted in FIG. 3A and FIG. 3B occur between the trace program and each node of the trace path. The iterations start from the originating node (e.g., the node requesting the content), and continue to the destination node. Note that the order of operations and components performing the operations depicted in FIG. 3A and FIG. 3B may vary according to implementation, and embodiments of the present invention are not limited to the order of operations depicted in FIG. 3A and FIG. 3B.

The trace program initially sends an Interest to the trace agent. The trace agent extracts a name, determines the next node for forwarding, generates a FIB entry and adds the entry to a FIB. The trace agent then generates a Content Object that includes the FIB entry name and trace information, and sends the Content Object to trace program. The trace program generates and submits to the network a new Interest with the FIB entry name. A similar process is repeated with each trace agent located at each intermediate node of the trace path, as the Interests propagate along the trace path.

As depicted in FIG. 3A, the trace program initially generates and disseminates a traceroute Interest (operation 302). The generated Interest includes a prefix /trace/agent/ and the name being traced. For example, if the trace program wants to trace /company/path/content/object, then the trace program generates a traceroute Interest for the requested content with name /trace/agent/company/path/content/object. The trace program disseminates the traceroute Interest to a trace agent. Initially, the trace program sends an Interest to the trace agent located on the same node (e.g., source node A) as the trace program. The nodes along the path being traced propagate subsequent Interests to the destination node.

The trace program can receive a Content Object for an Interest (operation 304), and determines whether the Content Object is from a destination node (operation 306). The Content Object from the destination node can include trace information and the requested content. If the Content Object is from the destination node, the trace program does not generate another Interest. The previous Interest has already reached the destination node, and path measurements are complete.

If the Content Object is not from the destination node, the trace program selects a FIB entry of the end node using the Content Object (operation 308). The trace program may extract a FIB entry name from the Content Object and also generates and disseminates another traceroute Interest (operation 310). The trace program may generate the Interest based on one or more FIB entry names in the Content Object. In some implementations, if there are multiple FIB entry names, the trace program may generate an Interest by choosing one of the FIB entry names that forwards to a single next hop. If there is only a single FIB entry, the trace program generates an Interest for that FIB entry. For example, trace program may generate an Interest for a FIB entry name:

/trace/agent/company/path/content/object/id(AB)/id(BC).
The process then continues with the trace program receiving another Content Object from the next node in the trace path.

The trace program may generate a new Interest (e.g., /company/path/content/object) for every hop in the path from the originating node of the trace up to the destination node. Also, the trace program may repeat operations 302 to 310 until an Interest arrives at a destination node that stores the content that may satisfy the Interest. Note that the Interest is forwarded toward the destination node based on the same type of rules and consuming the same amount of time as a non-traceroute Interest.

Figure 3B:
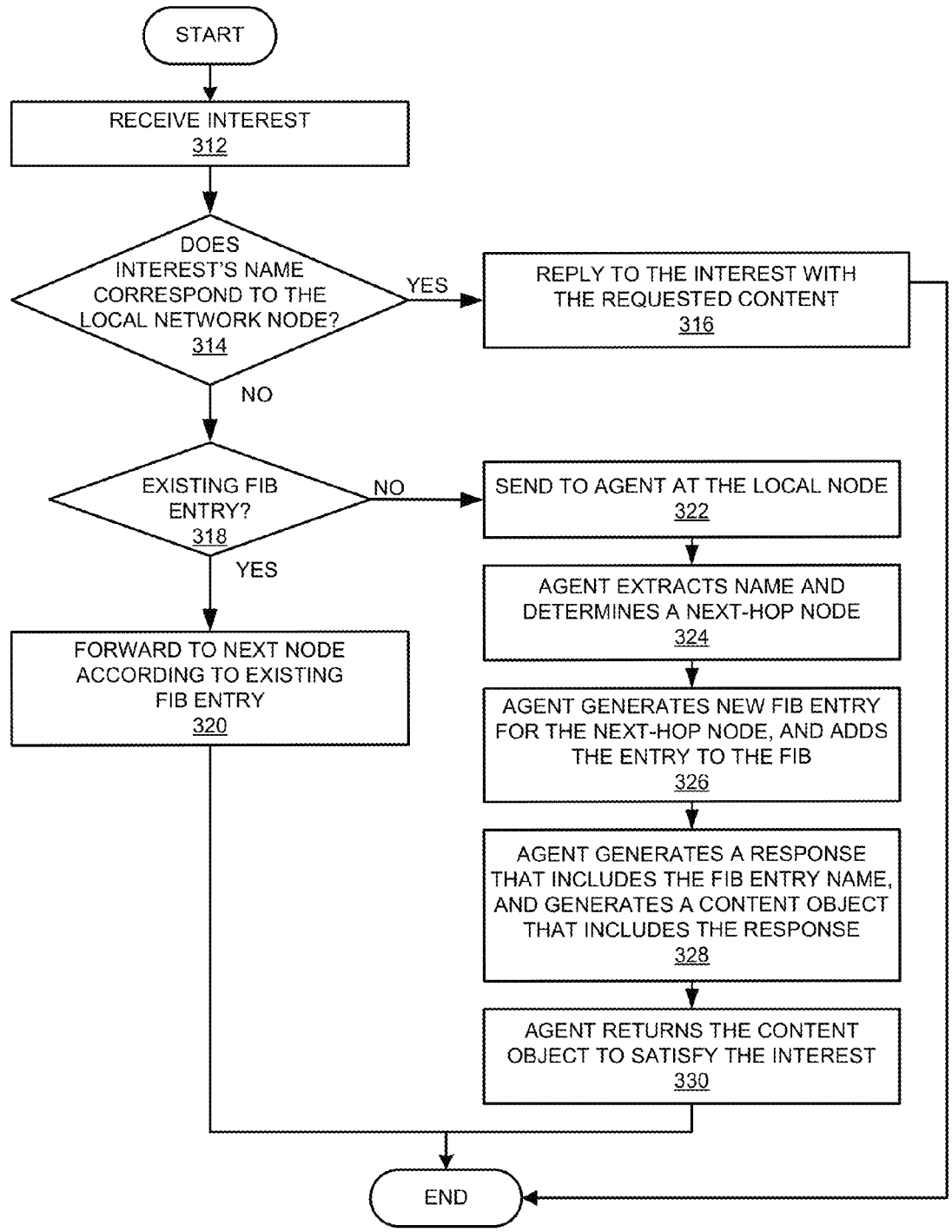
FIG. 3B presents a flow chart illustrating an exemplary process for a node with an agent trace program replying to the Interest, in accordance with an embodiment of the present invention.

FIG. 3B presents a flow chart illustrating an exemplary process for a node with an agent trace program replying to the Interest, in accordance with an embodiment of the present invention. As depicted in FIG. 3B, a node receives an Interest that has propagated along a network path from the trace program. The node replies to the Interest if the Interest's name corresponds to the local network node. Otherwise, if there is an existing FIB entry, the trace agent extracts a name, determines the next-hop node that is associated with the name, generates a FIB entry, and adds the FIB entry to a FIB. The trace agent then generates a Content Object that includes the FIB entry name and trace information, and sends the Content Object to trace program. Note that the destination node does not need to determine a forwarding node, and does not need to generate a FIB entry for the FIB. Rather, the destination node sends trace information back to the originating node, and can also send back the content named in the Interest.

As depicted in FIG. 3B, the node initially receives an Interest (operation 312). The node determines if the Interest's name corresponds to the local network node (operation 314). If the Interest's name corresponds to the local network node, the node replies to the Interest with the requested content (operation 316). The node can generate a Content Object with trace information and the requested content, and then return the Content Object. The trace information can include a list of neighboring nodes, a time delay, a timestamp, a transit time to each neighbor, and other information.

In some embodiments, the node can also generate and return a Content Object that includes information about new FIB entries. For example, if the node determines that an outbound interface exists to a neighboring node that can provide content for a namespace specified in the Interest, the network node can create a forwarding information base (FIB) entry for the outbound interface. Hence, by creating the FIB entry, the local node creates a path that "punches through" to a neighboring node that can also reply with additional content for the namespace. The local node can create the Content Object to include trace information from the local node, as well as include information on the new FIB entry to the neighboring node that can also provide content for the Interest's namespace.

If the Interest's name does not correspond to the local network node, then the node determines whether there is an existing FIB entry forwarding rule associated with the name of the Interest (operation 318). If there is an existing FIB entry, then the node forwards the Interest to the next node in the path (operation 320). For example, if the Interest arrives with a name of /trace/agent/company/path/content/object/id (AB)/id(BC), and the name is in the local FIB, then node A forwards the Interest to node B via the interface identified by "id(AB)." Note that in this scenario, the trace agent is not involved in processing the Interest. Operations 314, 318, and 320 can be performed by a forwarder, although different implementations may vary in the details. By bypassing the trace agent if there is already a forwarding rule entry in the FIB, there is no delay at the node due to agent processing.

Figure 4:
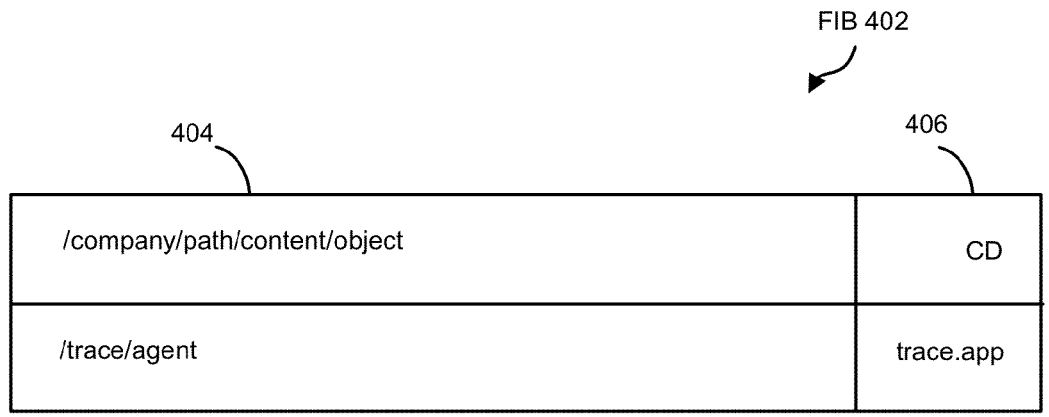
FIG. 4 presents a block diagram illustrating an exemplary FIB at a node C before receiving an Interest tracing a specific namespace, according to an embodiment.
Figure 5:
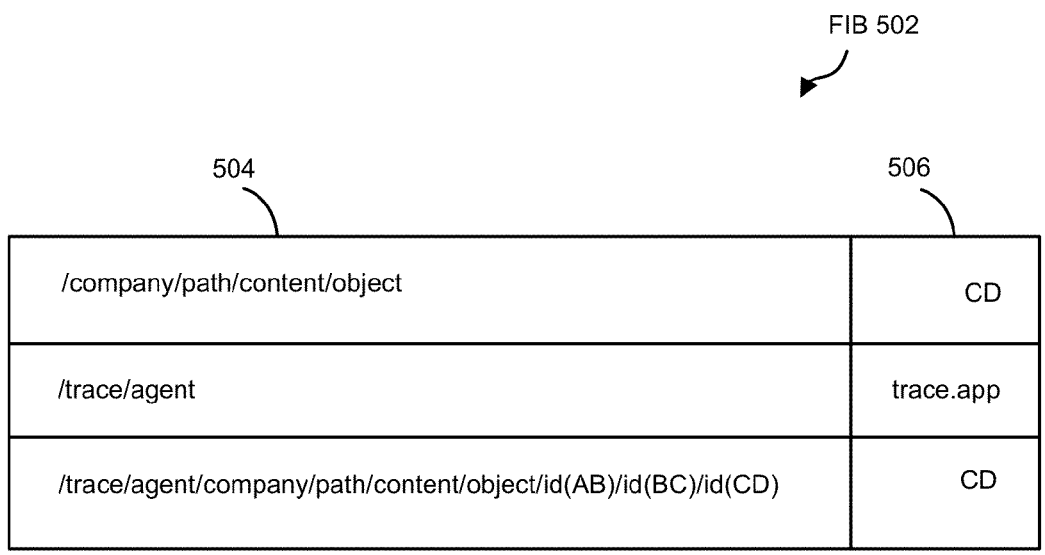
FIG. 5 presents a block diagram illustrating an exemplary FIB at node C after processing a route-tracing Interest at a trace agent, according to an embodiment.

On the other hand, if the FIB does not include a matching entry, the node sends the Interest to the trace agent at the node (operation 322). The trace agent extracts the name being traced (e.g., /company/path/content/object), and determines the next node to forward the Interest to (operation 324). The trace agent may reference the FIB to determine to which node it should forward an Interest with this name. An example of a FIB for node C is depicted in FIG. 4 and FIG. 5. In the present example, the Interest should be forwarded to node B and the link from node A to node B is represented as AB.

The trace agent generates a new FIB entry and adds the FIB entry to the FIB (operation 326). The trace agent may determine an interface identifier for an outbound interface, which corresponds to the next node in the trace path. For example, the trace agent can generate a trace name that includes the Interest's name and the interface identifier, create an id component for the interface, and append the id component to the trace name. The trace agent then creates the FIB entry to map the trace name to a forwarding rule that includes the outbound interface, and adds the FIB entry to the FIB.

For example, a trace agent at a node B may add /trace/agent/company/path/content/object/id(AB)/id(BC) as a FIB entry to the FIB, and sets the FIB entry to point to the interface BC. In some implementations, the trace agent may set the FIB entry to point to the next hop. By adding the FIB entry to the FIB, the next time that an Interest with a name of /trace/agent/company/path/content/object/id(AB)/id(BC) arrives, the forwarder at node B will automatically forward the Interest to node C without using the trace agent to process the Interest.

In some embodiments, the trace agent can generate and create multiple FIB entries, and/or can create a FIB entry whose forwarding rule includes multiple outbound interfaces. These multiple FIB entries and/or multiple outbound interfaces allow a trace to propagate via a tree pattern rather than via a single path.

The trace agent then assembles a response for the trace program, and generates a Content Object that includes this response (operation 328). This Content Object contains trace information as well as the information needed to continue to the next hop in the path. The Content Object may include the name of the FIB entry generated, such as:

/trace/agent/company/path/content/object/id(AB)/id(BC)/id(CD). For example, the trace agent may generate a Content Object with the name /trace/agent/company/path/content/object, which corresponds to the name of the Interest requesting content. The trace agent may then return the Content Object to satisfy the Interest (operation 330).

In some embodiments, a node may have multiple forwarding entries for a namespace. Hence, the trace agent may add multiple entries to the FIB. One FIB entry may include a rule that forwards the Interest to one node (e.g., node B), and another entry may include a rule that forwards the Interest to another node (e.g., node C). Moreover, a FIB entry may include a rule that forwards the Interest to more than one node (e.g., to node B and node C), or to multiple alternative nodes (e.g., to node B or node C). The trace agent can generate a Content Object that includes these multiple forwarding entries that the trace program at the source node can use to generate another Interest. The type and number of entries may depend on parameter settings at the intermediate node, and may vary according to different forwarding strategies and implementations. The trace program running at the originating node (e.g., trace program 114) can decide which forwarding rules to follow, or simply terminate the trace.

In some implementations, the trace program may run multiple times so that the differences between the replies on each run yield more information. This information may include, for example, the rate of change or the number of Interests that arrive for a certain namespace during the time between trace program executions.

The trace agents may remove the tracing FIB entries after a predetermined timeout period (or the FIB entries may be associated with an automatic timeout value). In some implementations, a trace agent can detect when the trace operation has finished, and can immediately remove the tracing FIB entries at that point. For example, trace program may send a final message round (possibly in reverse) that removes all the tracing FIB entries at the intermediate nodes.

Some implementations may also allow for establishing persistent paths. The FIB entries can remain in the FIB after a path has been established, and the trace program at the source node can monitor the path over time and at any time. If the path's FIB entries expire, the trace program can subsequently reestablish the same path at any time. Alternatively, trace agents within nodes along the path can periodically update the FIB entries to re-establish the trace path. The path information can be stored in the FIB or at the trace agent. The trace program can send messages to trigger trace agents to set up a previously stored node state associated with a path, which can be convenient to re-establish an optimal path. In some implementations, the trace program can also propagate the path information in compressed form in a packet to re-create the path.

In some implementations, the system can skip some nodes that may not have a trace agent running. For example, node A and node C may be hubs (or nodes before hubs) that have agents running, but node B may be a third-party device that does not have an agent running. Hence, a trace program at node A can generate a route-tracing Interest that can skip route-tracing operations at node B. This can be achieved by pre-populating FIB entries in node B, or by establishing a tunnel through node B.

Alternatively, a trace agent may monitor an Interest's complete name to search for trace queries, rather than monitoring the prefix alone. For example, the tracing program may send an Interest with a name that ends with a suffix "/trace" (e.g., "/company/path/content/object/trace"). When a matching name is detected, the trace agent may add a forwarding entry for the next node to the FIB (e.g., /company/path/content/object/trace/id(AB)). This allows a node to forward the trace packet as usual when the node is not running a trace agent, and allows a node that is running the trace agent to return the requested trace information. The trace program can also avoid modifying the name prefix by using other techniques to indicate the name is being traced. For example, the packet encoding may allow for tracing a packet (e.g., via some flag or via some DTAG value or other TLV value).

In some implementations, a node may also fork a trace agent process only upon receiving an Interest with a predetermined prefix. The trace agent may be associated with a traceability flag indicating that the trace agent is traceable. One can then trace the path of the Interest from the trace agent's node to the originating node, and obtain the performance measurements only between the originating node and the node with the trace agent. An Interest can also include a "report route" flag, and as each forwarder receives the Interest and detects this flag, the forwarder adds a node identifier to the Interest before forwarding the Interest to the next-hop node. When a node receives and processes the Interest at a trace agent, the trace agent can obtain a record of the trace path from the Interest, and can add this trace path to the Content Object to return to the trace program at the source node.

In some embodiments, a forwarder can add information to an Interest by appending the information to the Interest's name. This information can include, for example, node identifiers, link identifiers, transmit times, query parameters, etc. Also, the identifiers used to describe links can be global persistent identifiers, local persistent identifiers, or ephemeral identifiers. The trace agent can decide on the type of identifier to return in the Content Object.

Exemplary FIB

FIG. 4 presents a block diagram illustrating an exemplary FIB 402 at a node C before receiving an Interest tracing a specific namespace, according to an embodiment. As depicted in FIG. 4, there are two rule entries in FIB 402. Column 404 stores namespaces (e.g., a content name, and/or a /trace/agent prefix or path), and column 406 stores an associated interface and/or local application for a given namespace. For example, the namespace "/trace/agent" is mapped to the trace agent application (trace.app) to handle route-tracing Interests associated with the prefix. Also, the namespace "/company/path/content/object" is mapped to interface CD (e.g., an interface to a node D).

FIG. 5 presents a block diagram illustrating an exemplary FIB at node C after processing a route-tracing Interest at a trace agent, according to an embodiment. As depicted in FIG. 5, there are three rule entries in FIB 502. Similar to FIG. 4, column 504 stores a set of namespaces, and column 506 stores an associated interface and/or application that are to receive Interest packets associated with a given name. Specifically, FIB 502 can include the same entries that were described in FIG. 4. However, after processing a route-tracing Interest with a name:

"/trace/agent/company/path/content/object/id(AB)/id (BC)," the local trace agent determines that a next-hop node D can satisfy an Interest for "/trace/agent/company/path/content/object," and creates a FIB entry for:

"/trace/agent/company/path/content/object/id(AB)/id (BC)/id(CD)." Both FIB entries "/company/path/content/object" and "/trace/agent/company/path/content/object/id(AB)/id(BC)/id(CD)" are mapped to an interface "CD" for node D. When a future Interest arrives at node C with a name (or name prefix):

"/trace/agent/company/path/content/object/id(AB)/id (BC)/id(CD)," the node will directly forward the Interest to node D, based on the FIB entry.

Computer and Communication System

Figure 6:
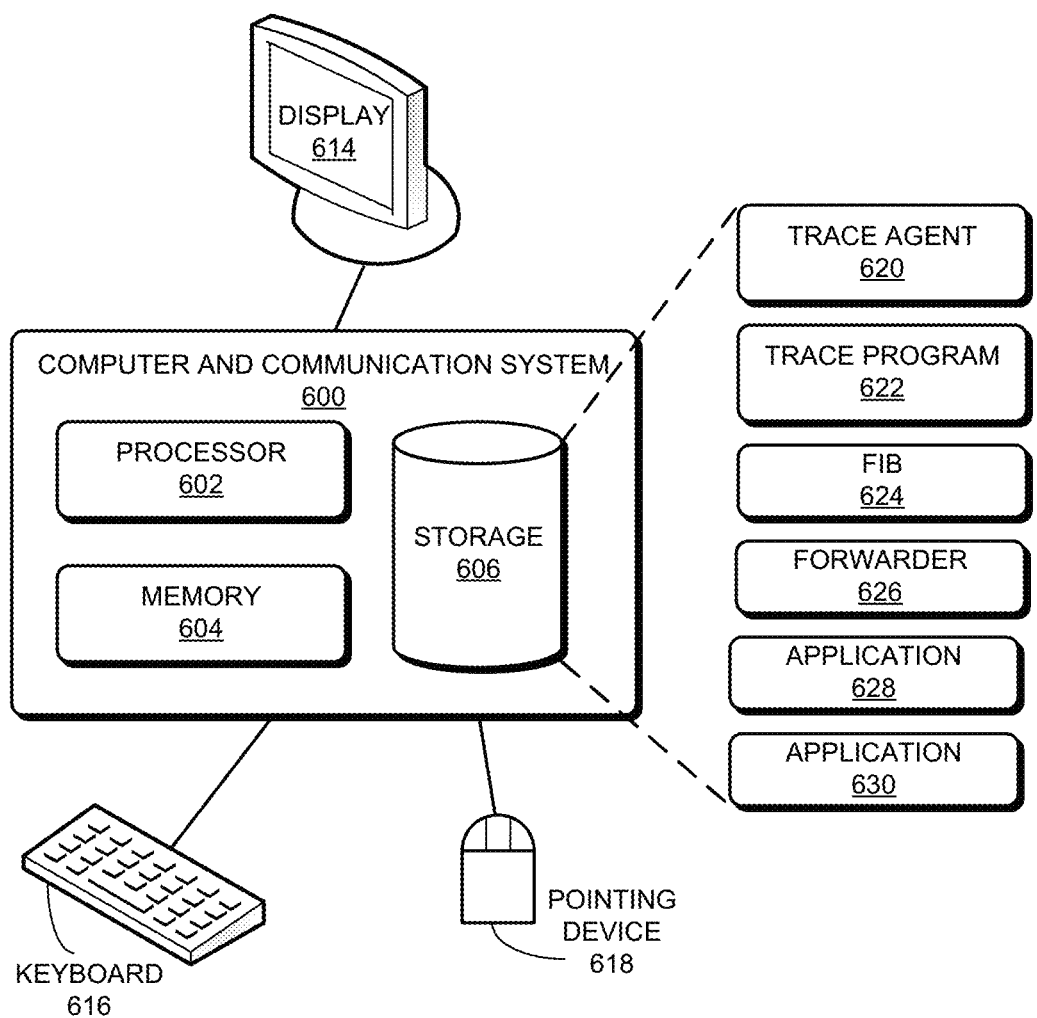
FIG. 6 presents an exemplary computer system for measuring correct forwarding performance of nodes in a CCN, in accordance with an embodiment of the present invention.

FIG. 6 presents an exemplary computer system for measuring correct forwarding performance of nodes in a CCN, in accordance with an embodiment of the present invention. As described with respect to FIG. 1, CCN devices can be any type of a computing device, including mobile computing devices, such as a laptop computer, a tablet or slate computer, a smartphone, or a personal digital assistant (PDA), or a stationary computing device, such as a desktop computer, an Internet server, or a home media server. FIG. 6 illustrates an example of such a computing device.

In FIG. 6, a computer and communication system 600 includes a processor 602, a memory 604, and a storage device 606. Storage device 606 stores programs to be executed by processor 602. Specifically, storage device 606 stores a trace agent 620, a trace program 622, a forwarder 624, a FIB 626, as well as other applications, such as applications 626 and 628. During operation, trace agent 620, forwarder 624, FIB 626, and optionally trace program 622 are loaded from storage device 606 into memory 604 and then executed by processor 602. While executing the program, processor 602 performs the aforementioned functions. Computer and communication system 600 is coupled to an optional display 614, keyboard 616, and pointing device 618.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method for measuring the performance of a path in a named-data network, the method comprising:
   receiving, at a network node, a first Interest generated by a source node that includes a name that corresponds to a route-tracing operation;
   determining, by the network node, that a received Interest includes a name that corresponds to a route-tracing operation;
   in response to determining that the first Interest includes the name matching the route-tracing operation, determining one or more outbound interfaces for the route-tracing operation based on the first Interest's name;
   creating one or more new forwarding information base (FIB) entries for the outbound interfaces, wherein a respective FIB entry maps the first Interest's name to a forwarding rule that includes a corresponding outbound interface;
   generating a Content Object that includes at least the names of the new FIB entries and trace information that facilitates path performance measurement;
   returning, to the source node, the Content Object;
   receiving, at the network node, a second Interest generated by the source node that includes at least one FIB entry name matching a FIB entry name previously returned to the source node from the network node; and
   performing a lookup in the FIB table with the FIB entry name in the second Interest to determine a next node for forwarding the second Interest; and
   forwarding the second interest to the next node.

2. The method of claim 1, further comprising determining trace information for the network node, wherein the trace information includes one or more of:
   a node identifier;
   a timestamp;
   a total path transit time;
   a transit time to each neighbor;
   a name and number of content objects cached under a traced prefix;
   average reply times for Interests issued by a node under a namespace;
   a set of links to neighboring nodes;
   an amount of free space or churn;
   congestion information;
   power status information;
   location information; and
   a number of pending Interests for the namespace.

3. The method of claim 1, further comprising:
   responsive to determining that the Interest's name also corresponds to a namespace that is provided by the network node, generating a second Content Object to include at least trace information associated with a second route-tracing operation.

4. The method of claim 1, wherein determining that the Interest's name is associated with the route-tracing operation involves determining that a component of the Interest's name matches a predetermined name for the route-tracing operation or application.

5. The method of claim 1, wherein creating the new FIB entry involves:
   determining an interface identifier for the outbound interface;
   generating a trace name that includes the Interest's name and the interface identifier; and
   creating the FIB entry to map the trace name to the forwarding rule that includes the outbound interface.

6. The method of claim 1, further comprising removing a FIB entry in response to one or more of:
   determining that a corresponding timeout period has been reached;
   detecting that a corresponding route-tracing operation has completed; and
   receiving, from a trace program, a message that includes instructions to remove the FIB entry.

7. The method of claim 1, wherein the name includes a set of one or more name components, wherein each name component indicates one or more of:
   a traceroute application for processing the Interest;
   a name for a piece of data for which to perform the route-tracing operation;
   an outgoing interface for one or more nodes along a path; and
   a forwarding rule to enter into the FIB.

8. The method of claim 1, further comprising determining whether the Interest's name is associated with a namespace provided by the network node, which involves performing a lookup operation in the FIB using the Interest's name, wherein a respective FIB entry maps a name to a forwarding rule.

9. A non-transitory computer-readable storage medium storing instructions which when executed by a computer cause the computer to perform a method for measuring the performance of a path in a named-data network, the method comprising:
   receiving, at a network node, a first Interest generated by a source node that includes a name that corresponds to a route-tracing operation:
   determining that a received Interest includes a name that corresponds to a route-tracing operation;
   in response to determining that the first interest includes the name matching the route-tracing operation, determining one or more outbound interfaces for the route-tracing operation based on the first Interest's name;
   creating one or more new forwarding information base (FIB) entries for the outbound interfaces, wherein a respective FIB entry maps the first Interest's name to a forwarding rule that includes a corresponding outbound interface;
   generating a Content Object that includes at least the names of the new FIB entries and trace information that facilitates path performance measurement;
   returning, to the source node, the Content Object;
   receiving, at the network node, a second Interest generated by the e source node that includes at least one FIB entry name matching a FIB entry name previously returned to the source node from the network node; and performing a lookup in the FIB table with the FIB entry name in the second Interest to determine a next node for forwarding the second Interest; and forwarding the second Interest to the next node.

10. The storage medium of claim 9, wherein the method further comprises determining trace information for the network node, wherein the trace information includes one or more of:
    a node identifier;
    a timestamp;
    a total path transit time;
    a transit time to each neighbor;
    a name and number of content objects cached under a traced prefix;
    average reply times for Interests issued by a node under a namespace;
    a set of links to neighboring nodes;
    an amount of free space or churn;
    congestion information;
    power status information;
    location information; and
    a number of pending Interests for the namespace.

11. The storage medium of claim 9, wherein the method further comprises:
    responsive to determining that the Interest's name also corresponds to a namespace that is provided by the network node, generating a second Content Object to include at least trace information associated with a second route-tracing operation.

12. The storage medium of claim 9, wherein determining that the Interest's name is associated with the route-tracing operation involves determining that a component of the Interest's name matches a predetermined name for the route-tracing operation or application.

13. The storage medium of claim 9, wherein creating the new FIB entry involves:
    determining an interface identifier for the outbound interface;
    generating a trace name that includes the Interest's name and the interface identifier; and
    creating the FIB entry to map the trace name to the forwarding rule that includes the outbound interface.

14. The storage medium of claim 9, wherein the method further comprises removing a FIB entry in response to one or more of:
    determining that a corresponding timeout period has been reached;
    detecting that a corresponding route-tracing operation has completed; and
    receiving, from a trace program, a message that includes instructions to remove the FIB entry.

15. The storage medium of claim 9, wherein the name includes a set of one or more name components, wherein each name component indicates one or more of:
    a traceroute application for processing the Interest;
    a name for a piece of data for which to perform the route-tracing operation;
    an outgoing interface for one or more nodes along a path; and
    a forwarding rule to enter into the FIB.

16. The storage medium of claim 9, wherein the method further comprises determining whether the Interest's name is associated with a namespace provided by the network node, which involves performing a lookup operation in the FIB using the Interest's name, wherein a respective FIB entry maps a name to a forwarding rule.

17. A computing system for measuring the performance of a path in a named-data network, the system comprising:
    one or more processors;
    a memory; and
    a non-transitory computer-readable medium coupled to the one or more processors storing instructions stored that, when executed by the one or more processors, cause the computing system to perform a method comprising:
    receiving, at a network node, a first Interest generated by a source node that includes a name that corresponds to a route-tracing operation;
    determining that a received Interest includes a name that corresponds to a route-tracing operation;
    in response to determining that the first Interest includes the name matching the route-tracing operation, determining one or more outbound interfaces for the route-tracing operation based on the first Interest's name;
    creating one or more new forwarding information base (FIB) entries for the outbound interfaces, wherein a respective FIB entry maps the first Interest's name to a forwarding rule that includes a corresponding outbound interface;
    generating a Content Object that includes at least the names of the new FIB entries and trace information that facilitates path performance measurement;
    returning, to the source node, the Content Object;
    receiving, at the network node, a second Interest generated by the source node that includes at least one FIB entry name matching a FIB entry name previously returned to the source node from the network node; and
    performing a lookup in the FIB table with the FIB entry name in the second Interest to determine a next node for forwarding the second Interest; and
    forwarding the second Interest to the next node.

18. The computing system of claim 17, wherein the method further comprises:
    determining trace information for the network node, wherein the trace information includes one or more of:
    a node identifier;
    a timestamp;
    a total path transit time;
    a transit time to each neighbor;
    a name and number of content objects cached under a traced prefix;
    average reply times for Interests issued by a node under a namespace;
    a set of links to neighboring nodes;
    an amount of free space or churn;
    congestion information;
    power status information;
    location information; and
    a number of pending Interests for the namespace.

19. The computing system of claim 17, wherein the method further comprises:
    responsive to determining that the Interest's name also corresponds to a namespace that is provided by the network node, generating a second Content Object to include at least trace information associated with a second route-tracing operation.

20. The computing system of claim 17, wherein determining that the Interest's name is associated with the route-tracing operation involves determining that a component of the Interest's name matches a predetermined name for the route-tracing operation or application.

* * * * *